United States Patent
Yan et al.

(10) Patent No.: US 8,719,839 B2
(45) Date of Patent: May 6, 2014

(54) TWO WAY COMMUNICATION SUPPORT FOR HETEROGENOUS PROCESSORS OF A COMPUTER PLATFORM

(75) Inventors: Shoumeng Yan, Beijing (CN);
Xiaocheng Zhou, Beijing (CN); Ying Gao, Beijing (CN); Mohan Rajagopalan, Mountain View, CA (US); Rajiv Deodhar, Phoenix, AZ (US); David Putzolu, Hillsboro, OR (US); Clark Nelson, Hillsboro, OR (US); Milind Girkar, Sunnyvale, CA (US); Robert Geva, Cupertino, CA (US); Tiger Chen, Beijing (CN); Sai Luo, Beijing (CN); Stephen Junkins, Bend, OR (US); Bratin Saha, Santa Clara, CA (US); Ravi Narayanaswamy, San Jose, CA (US); Patrick Xi, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/504,972

(22) PCT Filed: Oct. 30, 2009

(86) PCT No.: PCT/US2009/062692
§ 371 (c)(1),
(2), (4) Date: Nov. 1, 2012

(87) PCT Pub. No.: WO2011/053303
PCT Pub. Date: May 5, 2011

(65) Prior Publication Data
US 2013/0061240 A1      Mar. 7, 2013

(51) Int. Cl.
*G06F 9/44* (2006.01)
*G06F 9/45* (2006.01)
*G06F 15/00* (2006.01)

(52) U.S. Cl.
USPC ............. 719/312; 712/10; 717/140; 717/162; 719/316; 719/331

(58) Field of Classification Search
USPC ............. 712/10; 717/140, 162; 719/312, 316, 719/331
See application file for complete search history.

(56) References Cited

U.S. PATENT DOCUMENTS

| 6,151,638 A | 11/2000 | Hale et al. |
| 2003/0056084 A1 | 3/2003 | Holgate et al. |

(Continued)

FOREIGN PATENT DOCUMENTS

WO    2011/053303 A1    5/2011

OTHER PUBLICATIONS

International Search Report and Written Opinion received for PCT Patent Application No. PCT/US2009/062692, mailed on Jul. 16, 2010, 9 pages.

(Continued)

*Primary Examiner* — Charles E Anya
(74) *Attorney, Agent, or Firm* — Ryder, Lu, Mazzeo and Konieczny, LLC.

(57) ABSTRACT

A computer system may comprise a computer platform and input-output devices. The computer platform may include a plurality of heterogeneous processors comprising a central processing unit (CPU) and a graphics processing unit) GPU, for example. The GPU may be coupled to a GPU compiler and a GPU linker/loader and the CPU may be coupled to a CPU compiler and a CPU linker/loader. The user may create a shared object in an object oriented language and the shared object may include virtual functions. The shared object may be fine grain partitioned between the heterogeneous processors. The GPU compiler may allocate the shared object to the CPU and may create a first and a second enabling path to allow the GPU to invoke virtual functions of the shared object. Thus, the shared object that may include virtual functions may be shared seamlessly between the CPU and the GPU.

40 Claims, 11 Drawing Sheets

(56) References Cited

U.S. PATENT DOCUMENTS

| | | | |
|---|---|---|---|
| 2004/0083462 A1* | 4/2004 | Gschwind et al. | 717/140 |
| 2005/0075154 A1 | 4/2005 | Bordes et al. | |
| 2005/0097578 A1 | 5/2005 | Rangarajan | |
| 2006/0277368 A1* | 12/2006 | Lewis | 711/140 |
| 2008/0109795 A1* | 5/2008 | Buck et al. | 717/137 |
| 2008/0276261 A1 | 11/2008 | Munshi et al. | |
| 2008/0295120 A1 | 11/2008 | Suzuki et al. | |
| 2009/0320007 A1* | 12/2009 | Krishnaswamy et al. | 717/151 |
| 2010/0277486 A1* | 11/2010 | Bhoovaraghavan | 345/506 |
| 2010/0328326 A1* | 12/2010 | Hervas et al. | 345/522 |
| 2013/0125133 A1* | 5/2013 | Schuster | 718/105 |

OTHER PUBLICATIONS

Extended European Search Report received for European Patent Application No. 09850970.6, mailed on Apr. 17, 2013, 8 pages.

International Preliminary Report on Patentability and Written Opinion received for PCT Application No. PCT/US2009/062692, mailed on May 10, 2012, 7 pages.

* cited by examiner

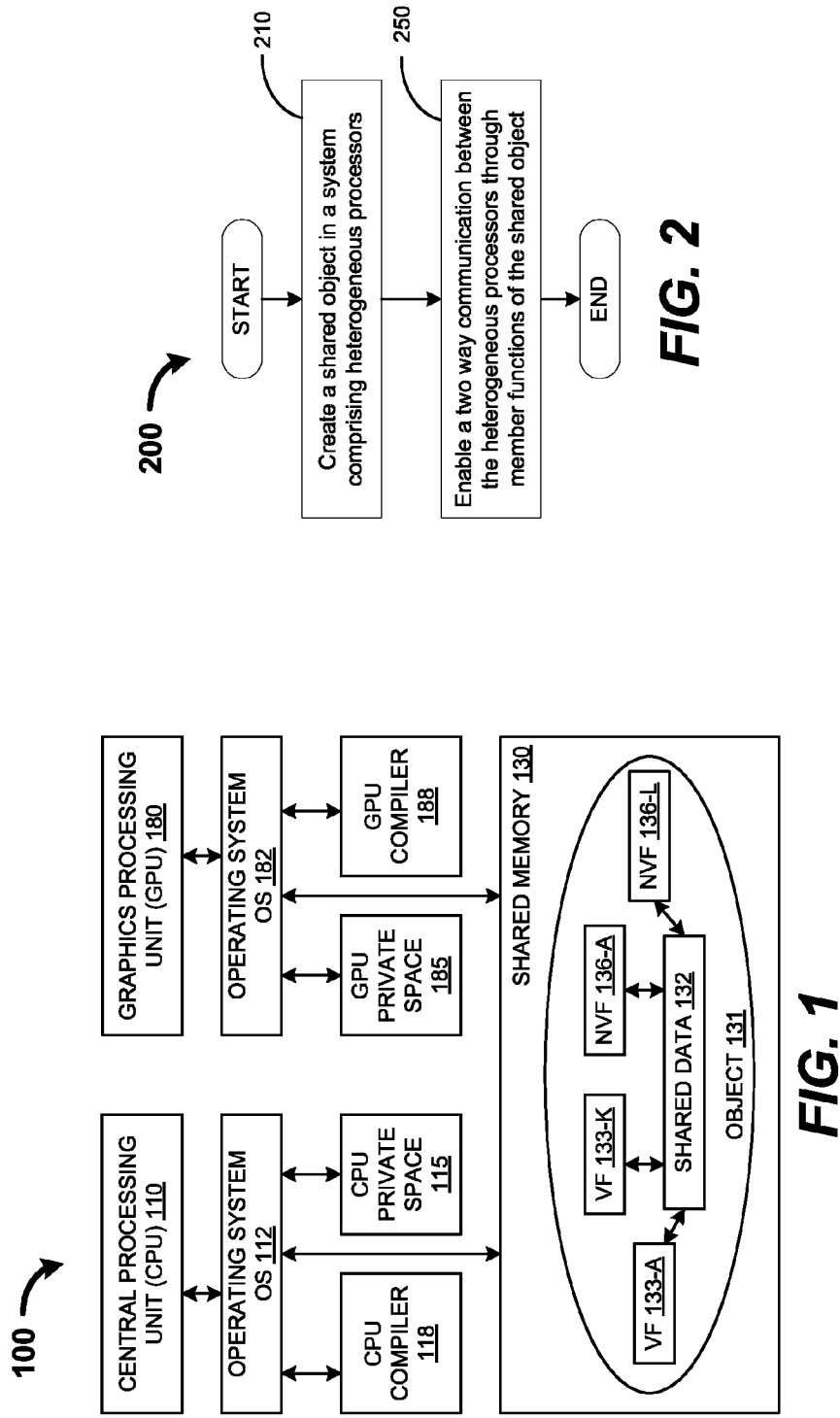

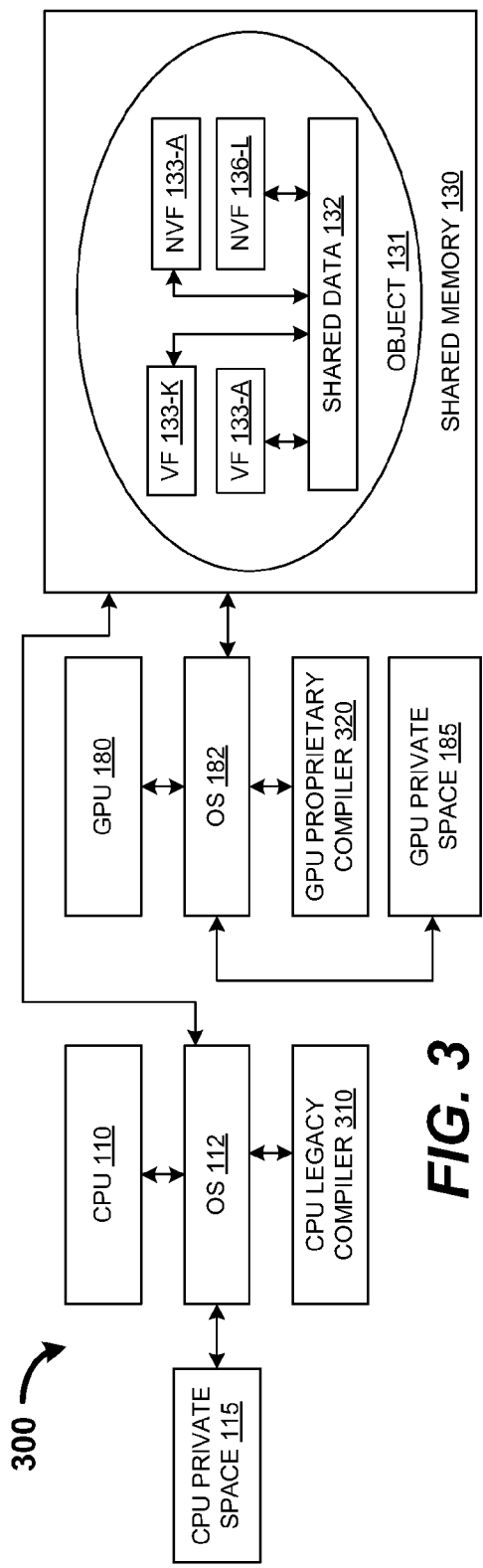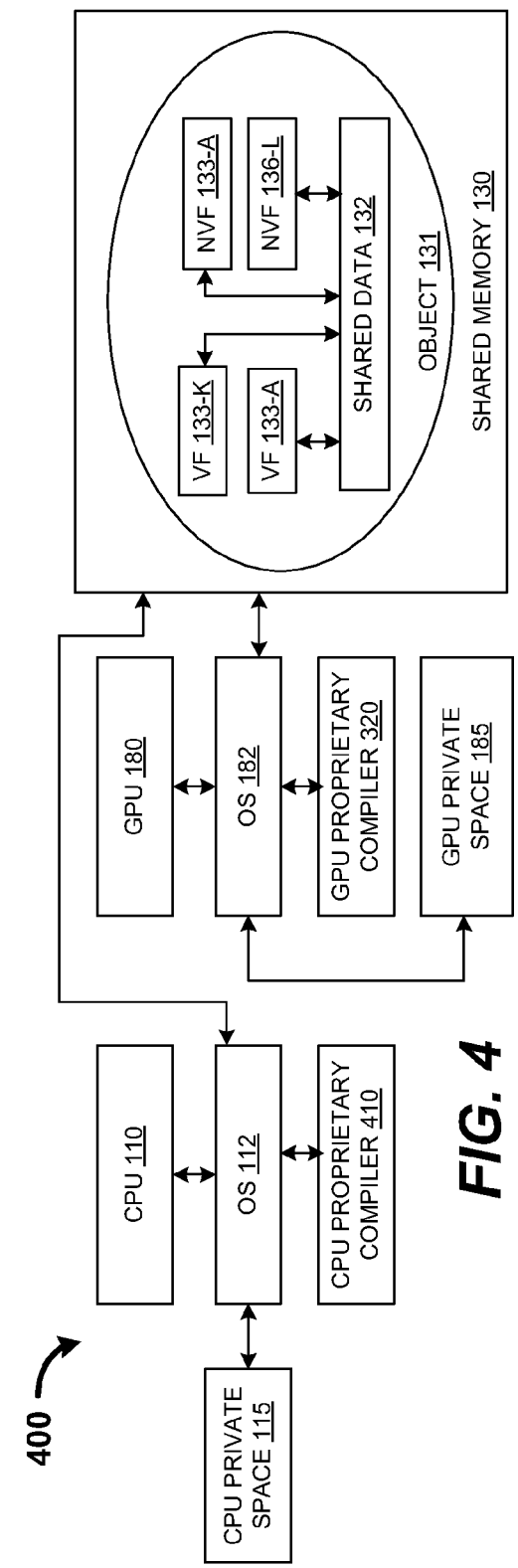

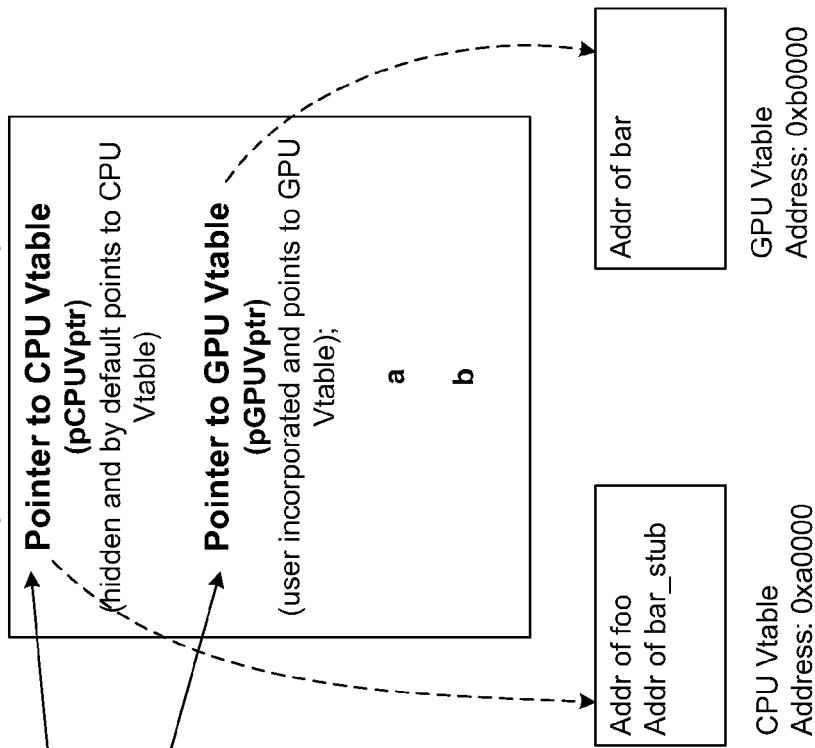

*CLASS*
Class B {
  Int a;
  Int b;
  Virtual Void foo(); //CPU side code
  #pragma GPU Virtural void bar();
}

*Layout of Object 'B' in shared memory*

|CPU addr of foo |---  |pCPUVptr |---|addr of bar in GPU side|
|CPU addr of bar_stub|

| a |
| b |

TWO WAY COMMUNICATION SUPPORT FOR HETEROGENOUS PROCESSORS OF A COMPUTER PLATFORM

BACKGROUND

Computer systems may comprise platforms supporting heterogeneous processors such as a central processing unit (CPU) and a graphics processing unit (GPU), symmetric and asymmetric processors. The class instances (or objects) of the object oriented language may reside in a first memory associated with a first side (e.g., CPU) of a CPU-GPU platform. The second side (GPU side) may not be enabled to invoke the objects and the associated member functions that reside in a first memory associated with the first side (CPU side) of the CPU-GPU platform. Also, the first side may not be enabled to invoke the objects and the associated member functions that reside in a second memory on the second side (GPU side). As the class instances or objects are stored in different address spaces, the existing communication mechanisms may merely allow one-way communication between the heterogeneous processors (CPU and the GPU) to invoke the class instance and the associated virtual functions.

Such one-way communication approach prevents a natural functionality partitioning of the class instances between the heterogeneous processors. An object may comprise throughput oriented member functions and some scalar member functions. For example, a scene class in a game application may have rendering functions that may be suited for the GPU and may also comprise physics and artificial intelligence (AI) functions that may be suited for execution on a CPU. With the current one-way communication mechanism, there typically has to be two different scene classes comprising CPU (physics and AI, in the above example) member functions and GPU (GPU suited rendering functions) member functions, respectively. With having two different scene classes one for the CPU and other for the GPU data may have to be copied back and forth between the two scene classes.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 1 illustrates a platform 100 that provides two way communication support between heterogeneous processors such as CPU and GPU in accordance with one embodiment.

FIG. 2 is a flow-chart, which illustrates an operation performed by the platform 100 two way communication support between heterogeneous processors such as CPU and GPU in accordance with one embodiment.

FIG. 3 illustrates a platform 300 comprising heterogeneous processors such as CPU and GPU coupled, respectively, to a CPU legacy compiler and a GPU proprietary compiler that provide object oriented language support for fine grain partitioning of a shared object in accordance with one embodiment.

FIG. 4 illustrates a platform 300 comprising heterogeneous processors such as CPU and GPU coupled, respectively, to a CPU proprietary compiler and a GPU proprietary compiler that provide object oriented language support for fine grain partitioning of a shared object in accordance with one embodiment.

FIGS. 7A-7C depict a shared object and the layout of the shared object in the memory in accordance with the first embodiment of the invention.

DETAILED DESCRIPTION

Figure 6:
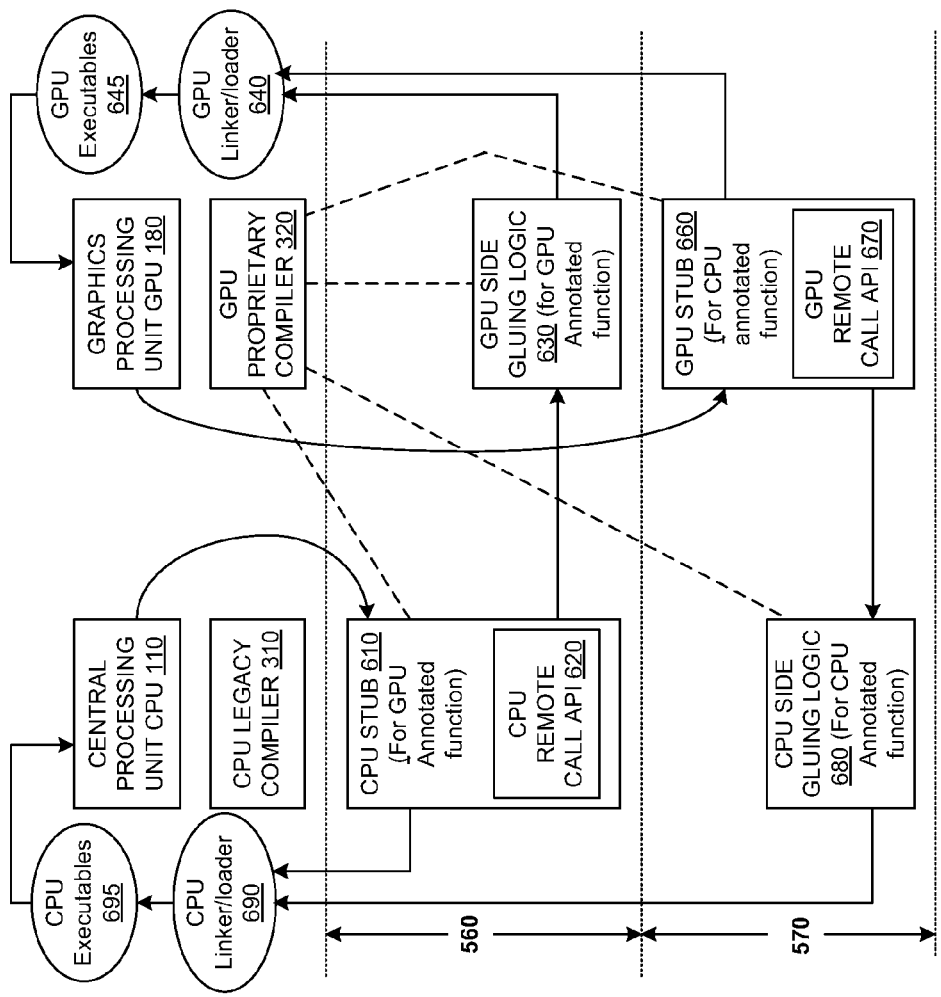
FIG. 6 illustrates a flow diagram depicting a two-way communication between the heterogeneous processors through member functions of the shared object in accordance with one embodiment.

The following description describes techniques to provide two-way communication between the heterogeneous processors of a computer platform by supporting fine grain partition of a shared object. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable storage medium may include any mechanism for storing or transmitting information in a form readable by a machine (e.g., a computing device).

For example, a machine-readable storage medium may include read only memory (ROM); random access memory (RAM); magnetic disk storage media; optical storage media; flash memory devices; electrical, optical forms of signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

In one embodiment, a computer platform may support one or more techniques to allow two way communications (function calls) between the heterogeneous processors (e.g., a CPU and a GPU) through member functions of a shared object by fine grain partitioning the shared object. In one embodiment, the computer platform may allow two-way communications between the CPU and the GPU using a first technique that may be caused by user incorporated macros (referred to as 'user intervention technique', hereafter). In other embodiment, the computer platform may allow two-way communications between the CPU and the GPU using a second technique that be independent of the user intervention (referred to as 'automatic technique', hereafter).

In one embodiment, while using user intervention technique, the shared object may be allocated on the first side (say CPU) and then used on the second side (say GPU) such that the GPU may invoke first member functions of the shared object that may be allocated with the CPU. In one embodiment, the second member functions of the shared object that are allocated with the GPU may be invoked by the CPU. As a result, two-way communication between the heterogeneous processors may be supported by a computer platform. In one embodiment, the user may cause an object (shared object) to be stored in a shared memory and then allocate the member functions to either one of the CPU or the GPU. In one embodiment, the user may annotate the member functions with the annotation tags to allocate the member functions to one of the CPU or the GPU. In one embodiment, the first member functions that are executed only by the GPU but that may be called by the CPU are annotated with a first annotation tag. Also, the second member functions that may be executed only by the CPU and called by the GPU may be annotated with a second annotation tag. In one embodiment, the GPU or CPU compiler may identify the annotation tags associated with the member functions while compiling the objects.

In one embodiment, the user may add macros such as a pointer macro and an initialization macro to, respectively, declare and initialize the pointer to virtual function table (vtable). In one embodiment, the pointer macro such as (const void*const pGPUvptr) may declare a pointer to the GPU side virtual function table (GPU vtable) and may override new/delete operator with shared memory allocation/release runtime calls. In one embodiment, the initialization macro such as (pGPUvptr=GetGPUvtableAddr( )) may initialize the pointer to GPU vtable with a proper runtime call.

In one embodiment, the GPU compiler may compile the object and generate a code for member functions annotated with the first annotation value. The GPU compiler may generate CPU side remote call stub for GPU member functions and the CPU side remote call stub may replace the original definition of the GPU member functions after linking with other user codes built with CPU legacy compiler. In one embodiment, the GPU compiler may generate GPU side gluing logic to dispatch a remote GPU member function call from the CPU side. In one embodiment, the GPU compiler may generate GPU side remote call stub and the CPU side gluing logic to dispatch a CPU member function call from the GPU side.

In other embodiment, while using the automatic technique, the virtual function tables (vtables) are loaded at the same address in the heterogeneous CPU and GPU platform. In one embodiment, the GPU compiler may generate CPU object files (first_obj_files) for shared class vtables and the GPU compiler may generate such a code on determining that an object is shared between CPU and GPU. The GPU compiler may store such shared class vtables in a special section (say .VtGPU) of the object file. The CPU compiler may generate CPU object files (second_obj_files) that may be linked with the CPU object files (first_obj_files) generated by the GPU compiler. The templates of building facilities (i.e. makefile or project file) may be arranged to have the first_obj_files (generated by the GPU compiler) precede the second_obj_files (generated by the CPU compiler).

In one embodiment, a linker may generate a final CPU executable using the GPU generated GPU vtable code (which may be a COMDATA symbol, for example) instead of a CPU vtable code generated by the CPU compiler. The linker may collect GPU compiler generated vtable codes at one contiguous section in the CPU executable as the first_obj_files have the same name .VtGPU. In one embodiment, to know the boundary of this special section (.VtGPU), the runtime library may allocate a variable (boundary_var) to know the start and the end of the .VtGPU section.

The run time library may use the start symbol to identify the start address of the special section .VtGPU. After identifying the section start address, the GPU side linker/loader may adjust the GPU executable base address such that the GPU vtable section may also reside at the same address. In one embodiment, the above activities may not be visible to the user and the user may not change anything in the class definition to share such object between CPU and LRB. In one embodiment, the above activities (or tasks) may be performed by one or more of the compiler, linker, or loader blocks.

An embodiment of a platform 100 providing object oriented language support for fine grain computation to support two-way communications between the heterogeneous processors is illustrated in FIG. 1. In one embodiment, the platform 100 may comprise a central processing unit (CPU) 110, an operating system (OS) 112 associated with the CPU 110, a CPU private space 115, a CPU compiler 118, a shared memory 130, a graphics processing unit (GPU) 180, an operating system (OS) 182 associated with the GPU 180, a GPU private space 185, and a GPU compiler 188. In one embodiment, the OS 112 may manage resources of the CPU 110, the CPU private space 115, and the shared memory 130 and the OS 182 may manage resources of the GPU 180, the GPU private space 185, and the shared memory 130.

In one embodiment, the CPU compiler 118 and the GPU compiler 188 may be, respectively, coupled to the CPU 110 and the GPU 180 or may be provided remotely on other platforms or computer systems as well. The compiler(s) 118 associated with the CPU 110 may generate a compiled code for the CPU 110 and the compiler(s) 188 associated with the GPU 180 may generate a compiled code for the GPU 180. In one embodiment, the CPU compiler 118 and the GPU compiler 188 may generate a compiled code by compiling one or more member functions of the objects provided by a user in a high level language such as objected oriented language. In one embodiment, the compiler 118 and 188 may cause the object to be stored in the shared memory 130 and the shared object 131 may comprise member functions allocated to either CPU side 110 or the GPU side 180. In one embodiment, the shared object 131 stored in the shared memory 130 may comprise member functions such as virtual functions VF 133-A to 133-K and non-virtual functions NVF 136-A to 136-L. In one embodiment, the two-way communication between the CPU 110 and the GPU 180 may be provided by the member functions such as VF 133 and NVF 136 of the shared object 131.

In one embodiment, the GPU compiler 188 may partition the member functions of the object 131 as CPU executables and GPU executables based on the annotation tags associated with the member functions. In one embodiment, the GPU compiler 188 may allocate the first member functions of the object 131, which are annotated using a GPU or first annotation tag (#Pragma GPU), to the GPU 180. In one embodiment, the CPU compiler 118 may allocate the second member functions of the object 131, which are annotated using a CPU or second annotation tag (#Pragma CPU), to the CPU 110. In one embodiment, the GPU compiler 188 may generate a stub and remote call logic and gluing logic on both the CPU side and the GPU side to provide support for two way communication. In other embodiment, while using the automatic technique, the GPU compiler 188 may provide support for two-way communication between the CPU 110 and the GPU 180 by loading the CPU and GPU vtables at the same address in the heterogeneous CPU and GPU platform. However, the contents of the GPU vtable may be different from that of the CPU vtable.

An embodiment of the heterogeneous platform 100 performing a two way communication between the heterogeneous processors (CPU 110 and the GPU 180) is depicted in FIG. 2. In block 210, the objects comprising the member functions that may be shared by the heterogeneous processors may be created in a platform 100. In one embodiment, a user may annotate member functions of the object 131 with either a first or a second annotation tags and the annotation tags may be used by the compilers 118 and/or 188 to create members functions of objects that may be shared by the CPU 110 and the GPU 180. In other embodiment, the compilers 118 and 188 may be designed and implemented such that the virtual member functions tables may be stored in the same memory address to create shared objects without requiring user intervention.

Typically, the CPU 110 and GPU 180 may be associated with different address spaces, linkers, and loaders and the addresses may be loaded at different addresses in the CPU 110 and GPU 180 address domains. The problem with the above approach is that the function addresses of CPU 110 and GPU 180 are not associated together. To overcome the above problem, in one embodiment, the jump tables comprising function address and function tables may be used. In one embodiment, the jump tables may be used to associate the function addresses of both sides of the CPU 110 and GPU 180 together and the tables may be loaded appropriately while the application is loaded.

In one embodiment, the annotation tags may be affixed by a user to the member functions while creating a program or a piece of code. In one embodiment, the compilers 118 and/or 188 may examine the annotation tags associated with the member functions and then may generate codes for the members functions (i.e., the virtual functions VF 133-A to 133-K, non virtual functions NVF 136-A to 136-L, and the shared data 132) of objects such as the shared object 131 residing in the shared memory 130.

In block 250, a two-way communication may be enabled to allow communication between the heterogeneous processors 110 and 180 through member functions 133 and 136 of the shared objects. In one embodiment, the GPU compiler 188 may generate enabling logic such as stub logic, remote call logic, and gluing logic (described in further detail in FIG. 6) on the CPU side and the GPU side to enable a natural functionality partitioning of a shared object 131 between the CPU 110 and the GPU 180. In one embodiment, the stub logic, remote call logic, and gluing logic may allow the second heterogeneous processor (CPU 110) to call the member functions allocated to the first heterogeneous processor (GPU 180). Likewise, the enabling logic may allow the first heterogeneous processor (GPU 180) to call the member functions allocated to the second heterogeneous processor (CPU 110). In one embodiment, such a two way communication between the heterogeneous processors 110 and 180 may provide fine grain computation between the heterogeneous processors. Some illustrations of a two-way communication between the CPU 110 and the GPU 180 are illustrated in FIGS. 8, 9 12, and 13 below.

An embodiment of a platform 300 in which the CPU 110 is associated with a legacy compiler and the GPU 180 is associated with a proprietary compiler that enable a two-way communication is illustrated in FIG. 3. In one embodiment, the CPU 110 may be associated with a CPU legacy compiler 310 and the GPU 180 may be associated with a GPU proprietary compiler 320. In one embodiment, the CPU legacy compiler 310 may comprise compilers provided by independent software vendors (ISVs) and the GPU proprietary compiler 320 may comprise compilers by the GPU manufacturers. The CPU legacy compiler 310 may compile the CPU side code and such a CPU legacy compiler provides minimal control and flexibility. To overcome the limitation associated with the CPU legacy compiler 310, the GPU proprietary compiler 320 may provide flexibility to support two-way communication between the CPU 110 and the GPU 180. In one embodiment, the GPU proprietary compiler 320 may create a first enabling path comprising a CPU stub, a CPU side remote call API, and a GPU side gluing logic, and a second enabling path comprising a GPU stub, a GPU side remote call API, and a CPU side gluing logic to provide a two-way communication between the CPU 110 and the GPU 180. The creation and operation of the first and the second enabling path is described in blocks 570 and 580 of FIG. 5 and the description of FIG. 6 below.

An embodiment of a platform 400 in which both the CPU 110 and the GPU 180 is associated with a proprietary compiler that enables two-way communication is illustrated in FIG. 4. In one embodiment, the CPU 110 may be associated with a CPU proprietary compiler 410 and the GPU 180 may be associated with a GPU proprietary compiler 320. In one embodiment, the CPU proprietary compiler 410 and the GPU proprietary compiler 320 may comprise compilers, respectively, provided by manufacturers of CPU and GPU. In one embodiment, the proprietary compilers 410 and 320 may provide higher flexibility to support two-way communication between the heterogeneous processors of the platform 100.

The description is continued with reference to a scenario in which the CPU 110 is associated with the CPU legacy compiler 310 and the flexibility to modify the CPU legacy compiler 310 to support two-way communication between the CPU 110 and the GPU 180 is minimal. However, the techniques discussed above with reference to the platform 300 of FIG. 3 may be easily applied in other scenarios including the platform 400 of FIG. 4.

Figure 5:
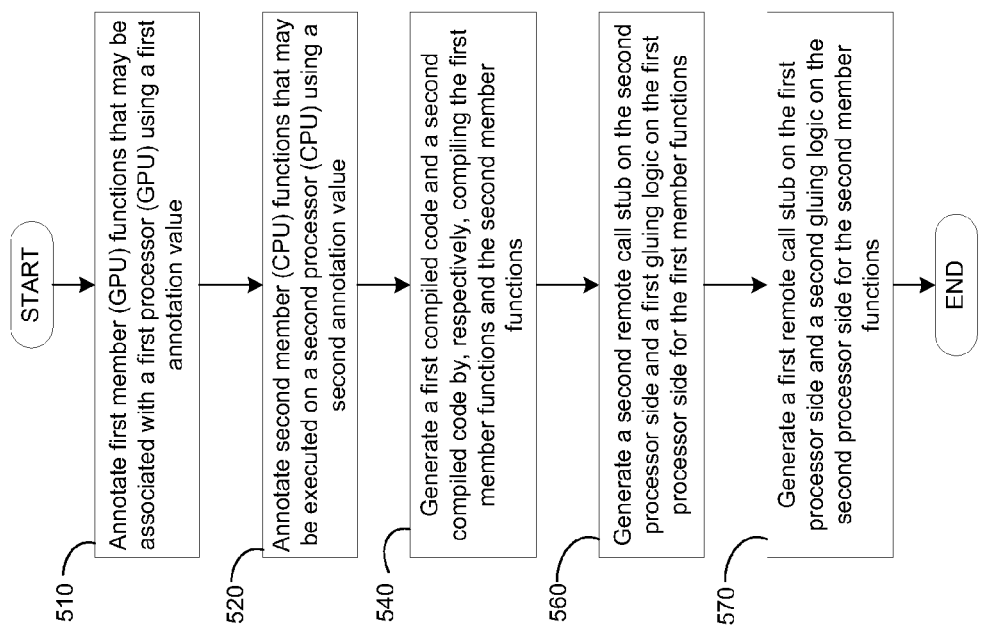
FIG. 5 is a flow-chart, which illustrates an operation performed by the platform 100 to provide a two-way communication between the heterogeneous processors in accordance with a first embodiment.

An embodiment of the platform 300, which may provide two-way communication between the CPU 110 and the GPU 180 is illustrated in flow-chart of FIG. 5. In block 510, a user may annotate the first member functions (e.g., VF 133-A and 133-D and NVF 136-A and 136-B) of the object 131 that may be allocated to the GPU 180 using a first annotation tag or GPU annotation tag. In one embodiment, the first member functions may be annotated during a code development phase in which an object may be defined. In one embodiment, the object 131 may include at least a first sub-set (referred to as first member functions) of the virtual functions VF 133-A to 133-K and the non-virtual functions NVF 136-A to 136-L and the first member functions may be annotated using the first annotation tag. In one embodiment, the first member functions may be annotated using the first annotation tag (#Pragma GPU).

In block 520, a user may annotate the second member functions of the object (e.g., VF 133-B and 133-K and NVF 136-C and 136-D) of the object 131 that may be allocated to the CPU 110 using a second annotation tag or CPU annotation tag. In one embodiment, the second member functions may be annotated during a code development phase in which a class of an object may be defined. In one embodiment, the second member functions may be annotated using the second annotation tag (#Pragma Wrapper).

In block 540, the CPU legacy compiler 310 and the GPU proprietary compiler 320 may, respectively, generate the first compiled code and the second compiled code. In one embodiment, the first and the second compiled code may be generated, respectively, by compiling the first member functions (e.g., VF 133-A and 133-D and NVF 136-A and 136-B) and the second member functions (e.g., VF 133-B and 133-K and NVF 136-C and 136-D). In one embodiment, the GPU proprietary compiler 320 may generate the first compiled code by compiling the first member functions, which are annotated with the first annotation tag (#Pragma GPU). However, the CPU 110 may call the first member functions using the two-way communication technique. In one embodiment, the CPU legacy compiler 310 may generate a second compiled code by compiling the second member functions, which are annotated using the second annotation tag (#Pragma Wrapper). However, the GPU 180 may call the second member functions using the two-way communication technique.

In block 560, the GPU proprietary compiler 320 may generate a CPU or second remote call stub on the second processor (CPU) side and a GPU or first gluing logic on the first processor (GPU) side for the first member functions annotated with first or the GPU annotation tag.

In block 580, the GPU proprietary compiler 320 may generate a GPU or first remote call stub on the first processor (GPU) side and a CPU or second gluing logic on the second processor (CPU) side for the second member functions.

An embodiment of a flow diagram used by the platform 100 to support two-way communication between the CPU 110 and the GPU 180 through member functions of the object that may be shared by the heterogeneous processors is illustrated in FIG. 6. In one embodiment, the GPU proprietary compiler 320 may generate a CPU stub for GPU annotated functions 610 and a CPU remote call API 620 on the CPU side 110. Also, the GPU proprietary compiler 320 may generate a GPU side gluing logic for GPU annotated function 630 on the GPU side 180 for the first member functions. In one embodiment, the CPU 110 may make calls to the first member functions using the first enabling path (comprising stub logic 610, API 620, and gluing logic 630) of a first path. In one embodiment, the first enabling path may allow the CPU 110 to establish a remote call with the GPU side 180 and transfer information from the CPU side 110 to the GPU side 180. In one embodiment, the GPU side gluing logic 630 may allow the GPU 180 to receive the information transferred from the CPU side 110.

In one embodiment, the CPU stub 610 may comprise the same name as the first member functions (i.e., original GPU member functions) but may enclose the API 620 to direct the call from the CPU 110 to the GPU 180. In one embodiment, the user code may call the first member functions as is but the call may be redirected to the CPU stub 610 and the remote call API 620. Also, while making a remote call, the CPU stub 610 may send a unique name representing the first member functions being called and a pointer to the shared object and other arguments of the called first member function. In one embodiment, the GPU side gluing logic 630 may receive the arguments and dispatch the first member functions call. In one embodiment, the GPU proprietary compiler 320 may generate a gluing logic (or a dispatcher) that may dispatch non-virtual functions by calling the GPU side function address for the first member functions with the object pointer passed as a first parameter. In one embodiment, the GPU proprietary compiler 320 may generate a jump table registration call on the GPU side to register the GPU side gluing logic 630 to enable CPU stub 610 to communicate with the GPU side gluing logic 630.

In one embodiment, the GPU proprietary compiler 320 may create a second enabling path comprising GPU stub for CPU annotated functions 660, a GPU remote call API 670 on the GPU side 180, and CPU side gluing logic for CPU annotated functions 680 for the second member functions allocated to the CPU 110. In one embodiment, the GPU 180 may make calls to the CPU side 110 using the second enabling path. In one embodiment, the GPU stub 660 and the API 670 may allow the GPU 180 to establish a remote call with the CPU side 180 and transfer information from the GPU side 180 to the CPU side 110. In one embodiment, the CPU side gluing logic 680 may allow the CPU 180 to receive the information transferred from the GPU side 110.

In one embodiment, to support the second member function call, the GPU proprietary compiler 320 may generate a jump table registration for the CPU side gluing logic 680. In one embodiment, the CPU side function address for the second member functions may be called in the CPU gluing logic 680. In one embodiment, the code generated by the CPU gluing logic 680 may be linked with other code generated by the CPU legacy compiler 310. Such an approach may provide a path to support two-way communication between the heterogeneous processors 110 and 180. In one embodiment, the CPU stub logic 610 and the CPU side gluing logic 680 may be coupled to the CPU 110 via CPU linker 690. In one embodiment, the CPU linker 690 may generate CPU executables 695 using the CPU stub 610, the CPU side gluing logic 680, and other code generated by the CPU legacy compiler 310. In one embodiment, the GPU stub logic 660 and the GPU side gluing logic 670 may be coupled to the GPU 180 via a GPU linker 640. In one embodiment, the GPU linker 640 may generate GPU executables 645 using the GPU gluing logic 530, the GPU stub 660, and the other code generated by the GPU proprietary compiler 320.

Another problem related to virtual functions of an objected oriented language is the lack of a dynamic approach to identify appropriate remote function address to call for a virtual remote member function of a shared object. To overcome the above problem, an embodiment to associate the shared object 131 with the GPU side (180) vtable, which in turn provides an appropriate GPU function address in the GPU vtable is described below. The CPU legacy compiler 310 may comprise a hidden pointer (pCPUvptr) to its object layout and the pCPUvptr may point to a CPU vtable, which may comprise CPU/wrapper/GPU stub virtual functions. In one embodiment, the GPU proprietary compiler 320 may comprise a GPU vtable, which may include GPU/wrapper stub virtual functions. In one embodiment, an appropriate GPU function address, which is an entry in the GPU vtable may be identified if the shared object 131 is associated with the GPU vtable. In one embodiment, such an association may be established by incorporating a new pointer (pGPUvptr) in the class declaration. In one embodiment, the new pointer (pGPUvptr) maybe initialized while constructing the object 131 by calling runtime API to get GPU side vtable address. In one embodiment, the task of creating an association between the object 131 and the GPU vtable may be performed using user incorporated declaration and initialization macros such as (const void*const pGPUvptr). In one embodiment, the macros may declare a pointer to the GPU side virtual function table (GPU vtable) and may override new/delete operator with shared memory allocation/release runtime calls.

An embodiment of the object 131 that may be stored in the shared memory 130 and its memory layout is illustrated in FIGS. 7A, 7B, and 7C. In one embodiment, an object 'A' such as the object 131 may include integer variable 'int a' and 'int b' and a CPU side function "Virtual Void foo( )" and a GPU side function "#Pragma GPU Virtual void bar( )" as shown in FIG. 7A. In one embodiment, the layout of the object A (or object 131) may comprise two pointers (1) pCPUVptr, which may point to a vtable comprising the address of foo and bar_stub in the CPU side 110; and (2) pGPUVptr, which may point to a vtable comprising the address of bar in the GPU side 180; and memory space for storing integer variables 'a' and 'b' as shown in FIG. 7B.

As depicted in FIG. 7C, in one embodiment, the pCPUVptr may point to a CPU Vtable comprising the address of foo and bar_stub in the CPU side 110, which may be located at a starting address of '0xa0000'. In one embodiment, the pointer to CPU Vtable (pCPUVptr) may be hidden and by default points to the CPU Vtable. In one embodiment, the pGPUVptr may point to a GPU Vtable comprising address of bar( ) in the GPU side 180, which may be located at a starting address of '0Xb0000'. In one embodiment, the pointer (pGPUVptr) to the GPU Vtable may be incorporated by the user in the code, which creates an association between the object 131 and the GPU Vtable.

Figure 8:
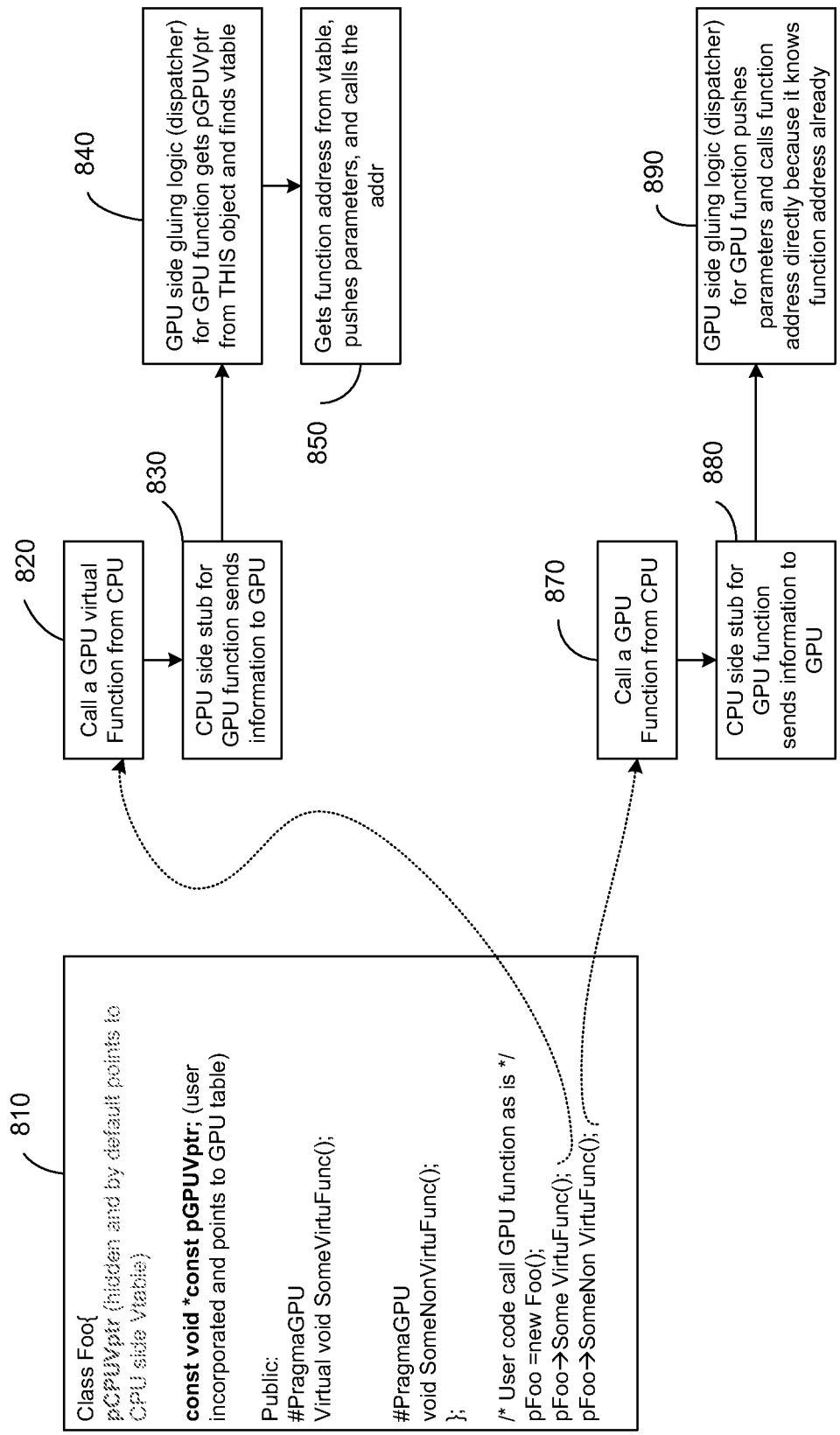
FIG. 8 illustrates a flow diagram depicting processing of a GPU virtual function and GPU function call made by the CPU side as it is in accordance with the first embodiment.

An embodiment a flow diagram 800 in which a GPU virtual function and GPU non-virtual function is called by the CPU side 110 using user intervention technique as it is illustrated in FIG. 8. Block 810 is shown comprising a class instance or an object titled foo( ), which includes user incorporated declaration const void*const pGPUVptr, hidden pointer pCPUVptr, and annotation tags #Pragma GPU annotating the virtual function (VF 133-A, for example) 'Virtual void SomeVirtuFunc( )' and non-virtual function (NVF 136-A, for example) 'void SomeNonVirtuFunc( )'. In one embodiment, 'pFoo' may point to a shared object 131 of class Foo( ) and a remote virtual function call may be completed from the CPU side 110 to the GPU side 180. In one embodiment, 'pFoo=new Foo( )' may override new/delete operator with shared memory allocation/release runtime calls. In one embodiment, the CPU legacy compiler 310, in response to compiling 'pFoo→SomeVirtuFunc( )' in block 810, may initiate a task depicted in block 820. In block 820, the CPU side 110 may call a GPU virtual function. In block 830, the CPU side stub (for GPU member functions) 610 and the API 620 may send information (arguments) to the GPU side 180. In block 840, the GPU side gluing logic (for GPU member functions) 630 may get pGPUVptr from THIS object and may find the GPU vtable. In block 850, the GPU side gluing logic 640 may get function address from the GPU vtable and push parameters and calls the address.

In one embodiment, the GPU proprietary compiler 320 in response to compiling #Pragma GPU 'void SomeVirtuFunc( )' in block 810 may generate code to use 'pFoo→SomeNonVirtuFunc( )' to initiate a task depicted in block 870. In block 870, the CPU side 110 may call a GPU non-virtual function. In block 880, the CPU side stub (for GPU member functions) 610 and the API 620 may send information (arguments) to the GPU side 180. In block 890, the GPU side gluing logic (for GPU member functions) 630 may push parameters and calls the address directly as the function address is already known.

Figure 9:
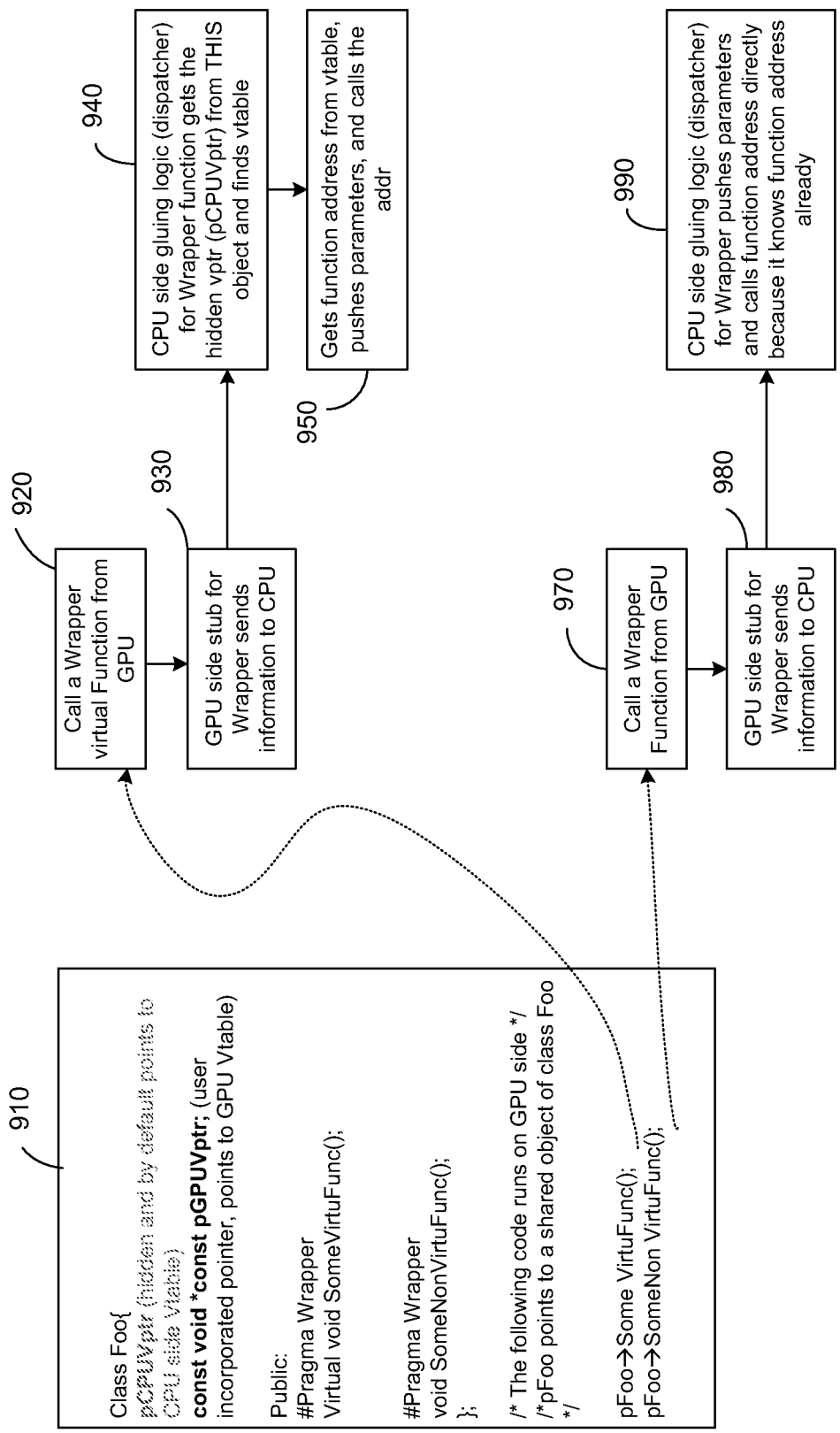
FIG. 9 illustrates a flow diagram depicting processing of a CPU virtual function and CPU function call made by the GPU side in accordance with the first embodiment.

An embodiment a flow diagram 900 in which a CPU virtual function and CPU non-virtual function is called by the GPU side 180 using user intervention technique is illustrated in FIG. 9. Block 910 is shown comprising a class instance or an object titled foo( ) which includes user incorporated declaration const void*const pGPUVptr, hidden pointer pCPUVptr, and annotation tags #Pragma Wrapper annotating the virtual function (VF 133-A, for example) 'Virtual void SomeVirtuFunc( )' and a non-virtual function (NVF 136-A, for example) 'void SomeNonVirtuFunc( )'. In one embodiment, 'pFoo' may point to a shared object 131 of class Foo( ) and a remote virtual function call may be completed from the GPU side 180 to the CPU side 110. In one embodiment, the GPU proprietary compiler 320 in response to compiling #Pragma Wrapper 'Virtual void SomeVirtuFunc( )' in block 910 may generate a code to use 'pFoo→SomeVirtuFunc( )' to initiate a task depicted in block 920. In block 920, the GPU side 180 may call a Wrapper virtual function. In block 930, the GPU side stub (for Wrapper member functions) 660 and the API 670 may send information (arguments) to the CPU side 110. In block 940, the CPU side gluing logic (for wrapper member functions) 680 may get hidden pointer (pCPUVptr) from THIS object and may find the CPU vtable. In block 950, the CPU side gluing logic 680 may get function address from the CPU vtable and push parameters and calls the address.

In one embodiment, the GPU proprietary compiler 320 in response to compiling #Pragma Wrapper 'void SomeVirtuFunc( )' in block 910 may generate code to use 'pFoo→SomeNonVirtuFunc( )' to initiate a task depicted in block 970. In block 970, the GPU side 180 may call the Wrapper non-virtual function. In block 980, the GPU side stub (for Wrapper member functions) 660 and the API 670 may send information (arguments) to the CPU side 110. In block 990, the CPU side gluing logic (for Wrapper member functions) 680 may push parameters and calls the address directly as the function address is already known.

Figure 10:
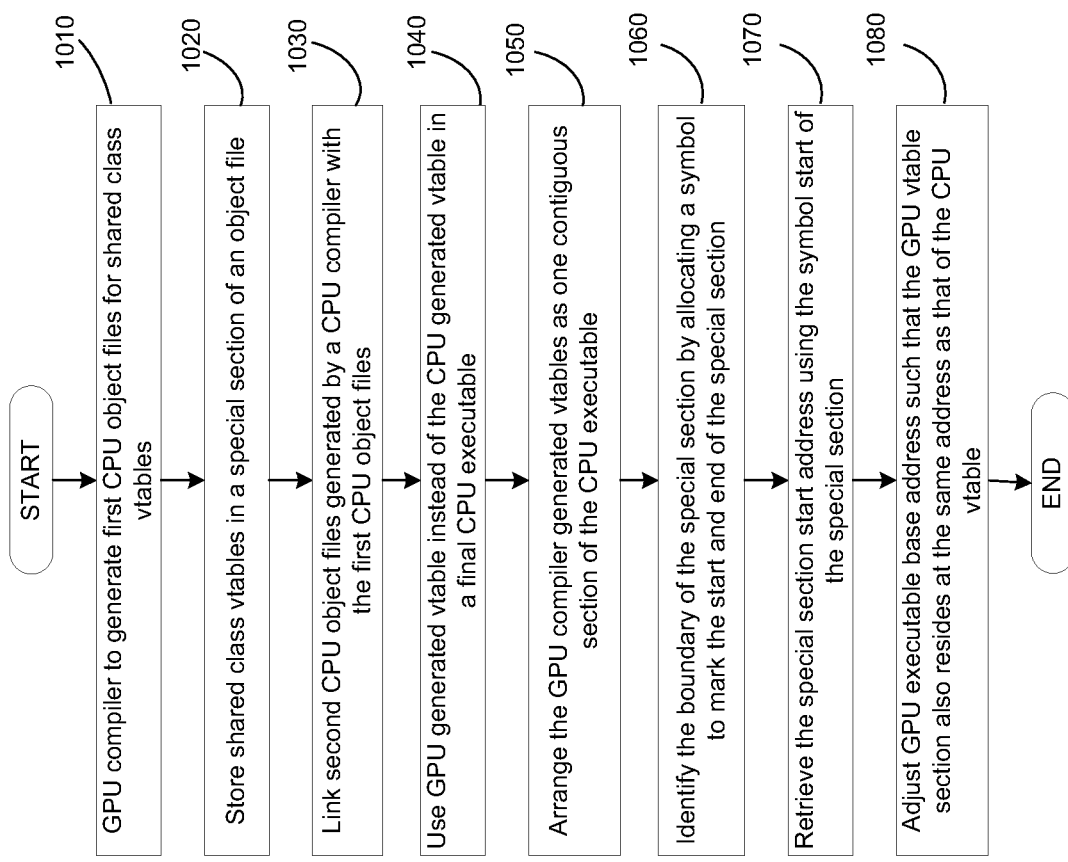
FIG. 10 is a flow-chart, which illustrates an operation performed by the platform 100 to provide a two-way communication between the heterogeneous processors in accordance with a second embodiment.

An embodiment of the platform 100 that may support a two-way communication between the heterogeneous processors using automatic technique is illustrated in FIG. 10. While using the automatic technique, the GPU proprietary compiler 320, the GPU linker/loader 640, and the CPU linker/loader 690 may be implemented such that the address of the CPU and GPU virtual function tables (vtables) may be loaded at the same address in the heterogeneous CPU and GPU platform.

In block 1010, the GPU proprietary compiler 320 may generate first CPU object file (first_obj_file) for shared class vtables. In one embodiment, the GPU proprietary compiler 320 may generate such a code on determining that an object is shared between CPU 110 and GPU 180. In block 1020, the GPU proprietary compiler 320 may store such shared class vtables in a special section (say .VtGPU) of the object file.

In block 1030, the GPU proprietary compiler 320 may link a second CPU object file (second_obj_file) generated by the CPU legacy compiler 310 with the first CPU object file (first_obj_file) generated by the GPU proprietary compiler 320. The templates of building facilities (i.e. makefile or project file) may be arranged to have the first_obj_files (generated by the GPU compiler) precede the second_obj_files (generated by the CPU compiler).

In block 1040, the CPU linker 690 may generate a final CPU executable using the vtables generated by the GPU proprietary compiler 320 instead of vtables generated by the CPU legacy compiler 310. To ensure that the vtables generated by the GPU proprietary compiler 320 are placed in a contiguous section within the special section, the GPU proprietary compiler 320 may attach an attribute such as COMDAT attribute to the CPU side vtables generated by the GPU proprietary compiler 320.

The CPU side vtables generated by the CPU legacy compiler 310 may be already associated with an attribute such as COMDAT attribute. In one embodiment, the GPU linker/loader 640 may select the COMDAT symbol in one of the object files if the COMDAT symbol is defined in more than one object files and the remaining may be ignored. In one embodiment, the linking order may be arranged such that the CPU vtables generated by the GPU proprietary compiler 320 may be included in the final executable while excluding the CPU vtables generated by the CPU legacy compiler 310.

In block 1050, the CPU linker/loader 690 may collect vtables generated by the GPU proprietary compiler 320 at one contiguous section in the CPU executable as the first_obj_file has the same name .VtGPU.

In block 1060, the run time library supported by the CPU linker/loader 690 may allocate a symbol/variable (boundary_var) to identify the start and the end of the special section (.VtGPU). For example, on Windows®, the section start symbol may be defined in section .VtGPU$A and the linker/loader 690 may use the start symbol .VtGPU$A at the beginning of the special section .VtGPU.

In block 1070, the run time library may use the start symbol to retrieve the start address of the special section .VtGPU. In block 1080, the GPU side linker/loader 640 may adjust the GPU executable base address such that the GPU vtable section may also reside at the same address. In one embodiment, the above activities may not be visible to the user and the user may not change anything in the class definition to share such object between CPU and LRB. In one embodiment, the above activities (or tasks) may be performed by one or more of the compiler, linker, or loader blocks.

Figures 11A, 11B, 11C:
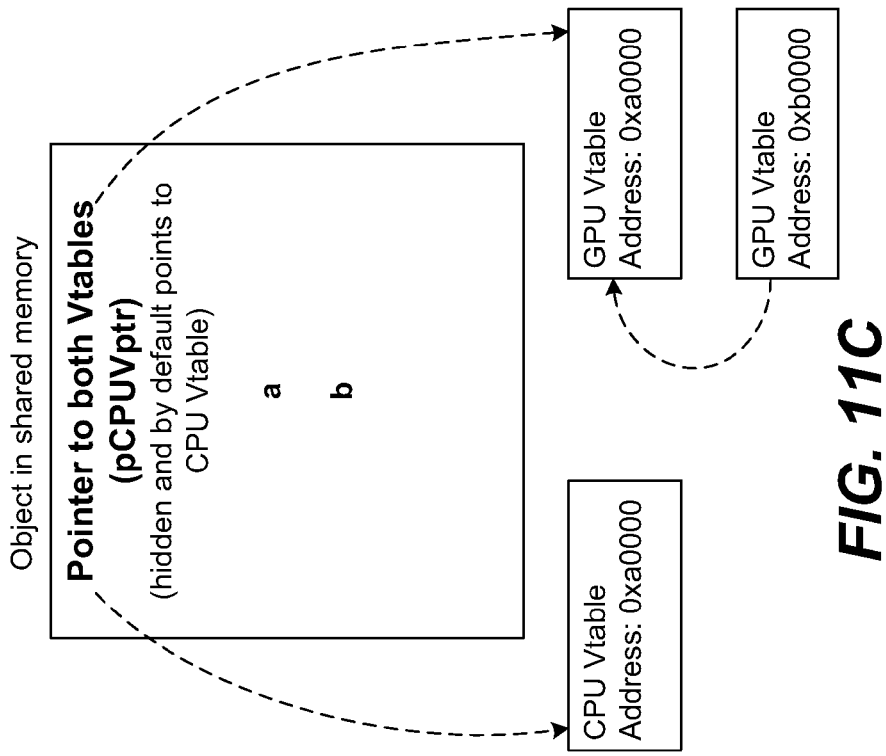
FIGS. 11A-11C depicts a shared object and the layout of the shared object in the memory in accordance with the second embodiment of the invention.

An embodiment of the object 131 that may be stored in the shared memory 130 and its memory layout is illustrated in FIG. 11. In one embodiment, an object 13' such as the object 131 may include integer variable 'int a' and 'int b' and a CPU side function "Virtual Void foo( )" and a GPU side function "#Pragma GPU Virtual void bar( )" as shown in FIG. 11A. In one embodiment, the layout of the object B (or object 131) may comprise a single pointer (pCPUVptr), which may point to the address of foo and bar_stub in the CPU side 110 and memory space for storing integer variables 'a' and 'b' as shown in FIG. 11B. As may be noted, the memory layout of FIG. 11B may comprise only one pointer (pCPUVptr), which may point to both the CPU vtable and the GPU vtable.

As depicted in FIG. 11C, in one embodiment, the pCPUVptr may point to a CPU vtable comprising the address of foo and bar_stub in the CPU side 110 and may, which may be located at a starting address of '0xa0000'. In one embodiment, the pointer to CPU Vtable (pCPUVptr) may be hidden and by default points to the CPU Vtable. In one embodiment, the pCPUVptr may point to the GPU vtable at the same address '0xa0000' as well. However, the original GPU vtable may be located at a different address such as '0xb0000'. As a result of the GPU linker/loader 640 adjusting (block 1080 of FIG. 10) the GPU executable base address, the GPU vtable section may also reside at the same address '0xa0000'. However, the contents of the CPU vtable and the contents of the GPU vtable may be different (for example, CPU vtable comprises the address of foo and bar_stub and the GPU vtable comprises the address of bar) even though the addresses of both the CPU vtable and GPU vtable may be the same. In one embodiment, the above activities may be performed by one or more of the compiler, linker, or loader blocks and the activities may be performed without user intervention as well.

Figure 12:
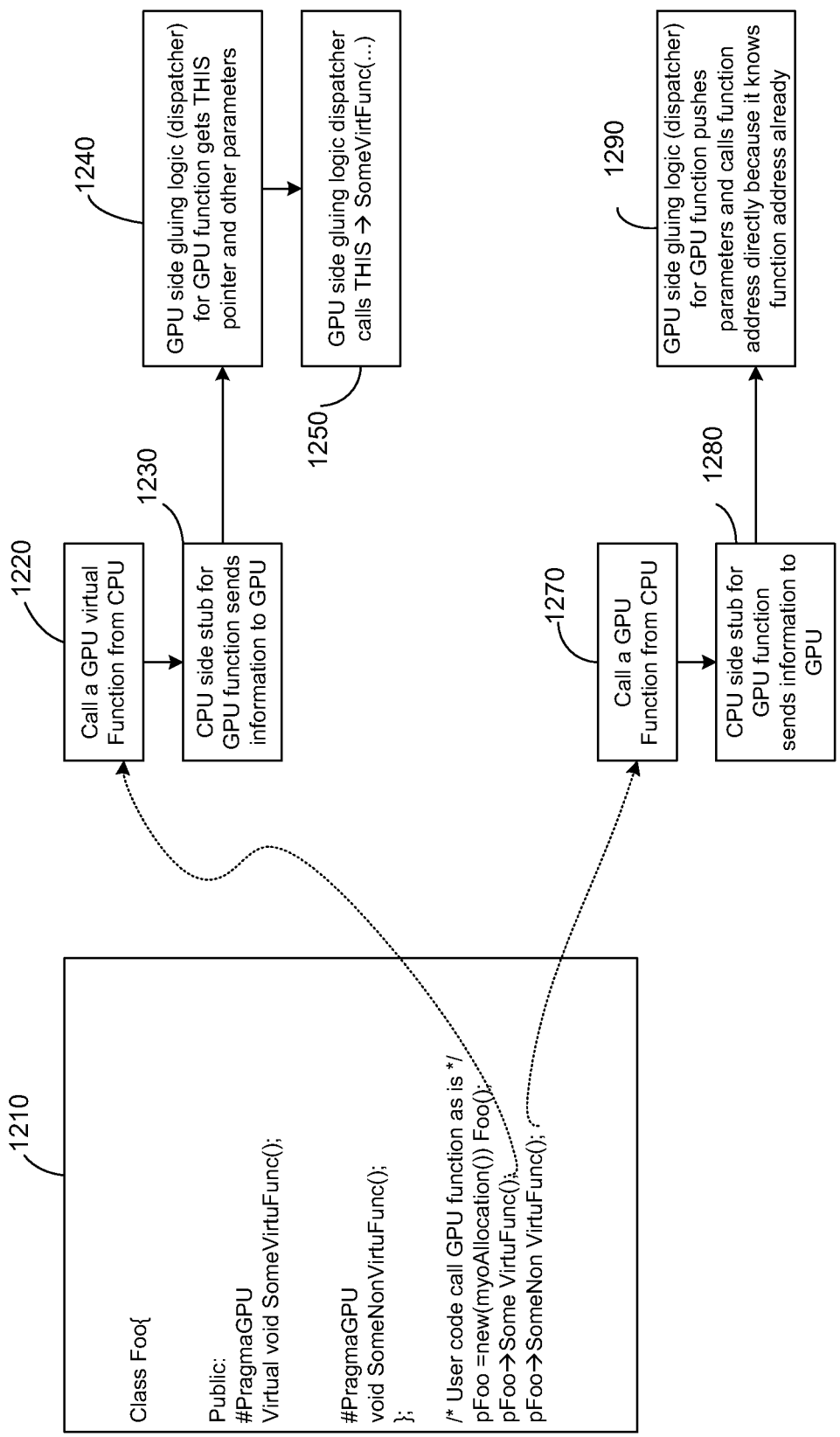
FIG. 12 illustrates a flow diagram depicting processing of a GPU virtual function and GPU function call made by the CPU side as it is in accordance with the second embodiment.

An embodiment a flow diagram 1200 in which a GPU virtual function and GPU non-virtual function is called by the CPU side 110 using automatic technique as it is illustrated in FIG. 12. In one embodiment, the flow diagram of 1200 may be substantially similar to that of the flow diagram 800 of FIG. 8. However, the difference between the flow diagrams 1200 and 800 is that a user may not be required to incorporate macros as was required in the user intervention technique described above. As a result, the block 1210 may not comprise the macros const void*const pGPUVptr compared to the block 810 of the FIG. 8. As mentioned above, the task of loading the address of the CPU and GPU virtual function tables (vtables) at the same address in the heterogeneous CPU and GPU platform may be performed by the compiler and linker/loader blocks without requiring user intervention.

Figure 13:
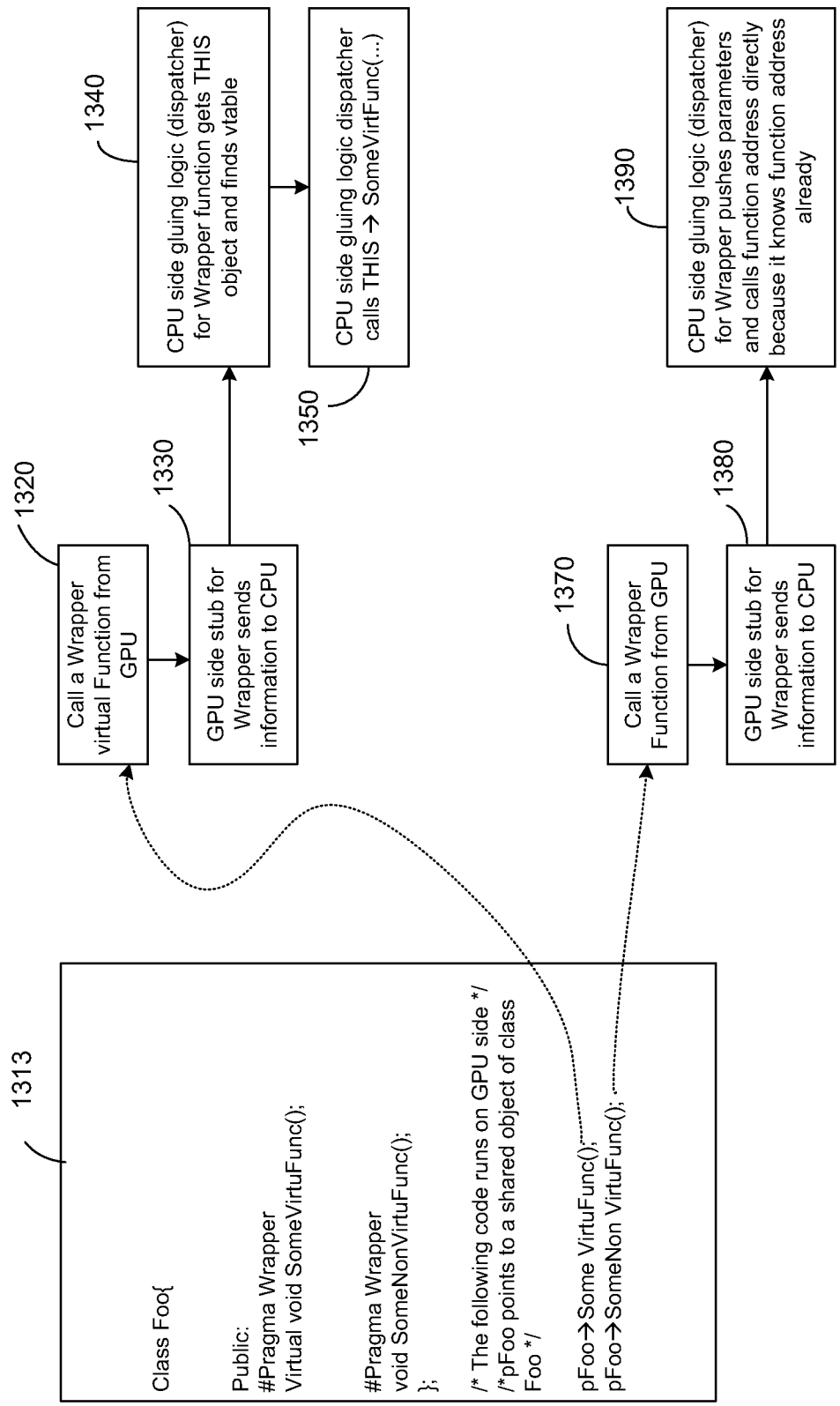
FIG. 13 illustrates a flow diagram depicting processing of a CPU virtual function and CPU function call made by the GPU side in accordance with the second embodiment.

An embodiment a flow diagram 1300 in which a CPU virtual function and CPU non-virtual function is called by the GPU side 180 using automatic technique is illustrated in FIG. 13. In one embodiment, the flow diagram of 1300 may be substantially similar to that of the flow diagram 900 of FIG. 9. However, the difference between the flow diagrams 1300 and 900 is that a user may not be required to incorporate macros as was required in the user intervention technique described above. As a result, the block 1310 may not comprise the macros const void*const pGPUVptr compared to the block 910 of the FIG. 9. As mentioned above, the task of loading the address of the CPU and GPU virtual function tables (vtables) at the same address in the heterogeneous CPU and GPU platform may be performed by the compiler and linker/loader blocks without requiring user intervention.

Figure 14:
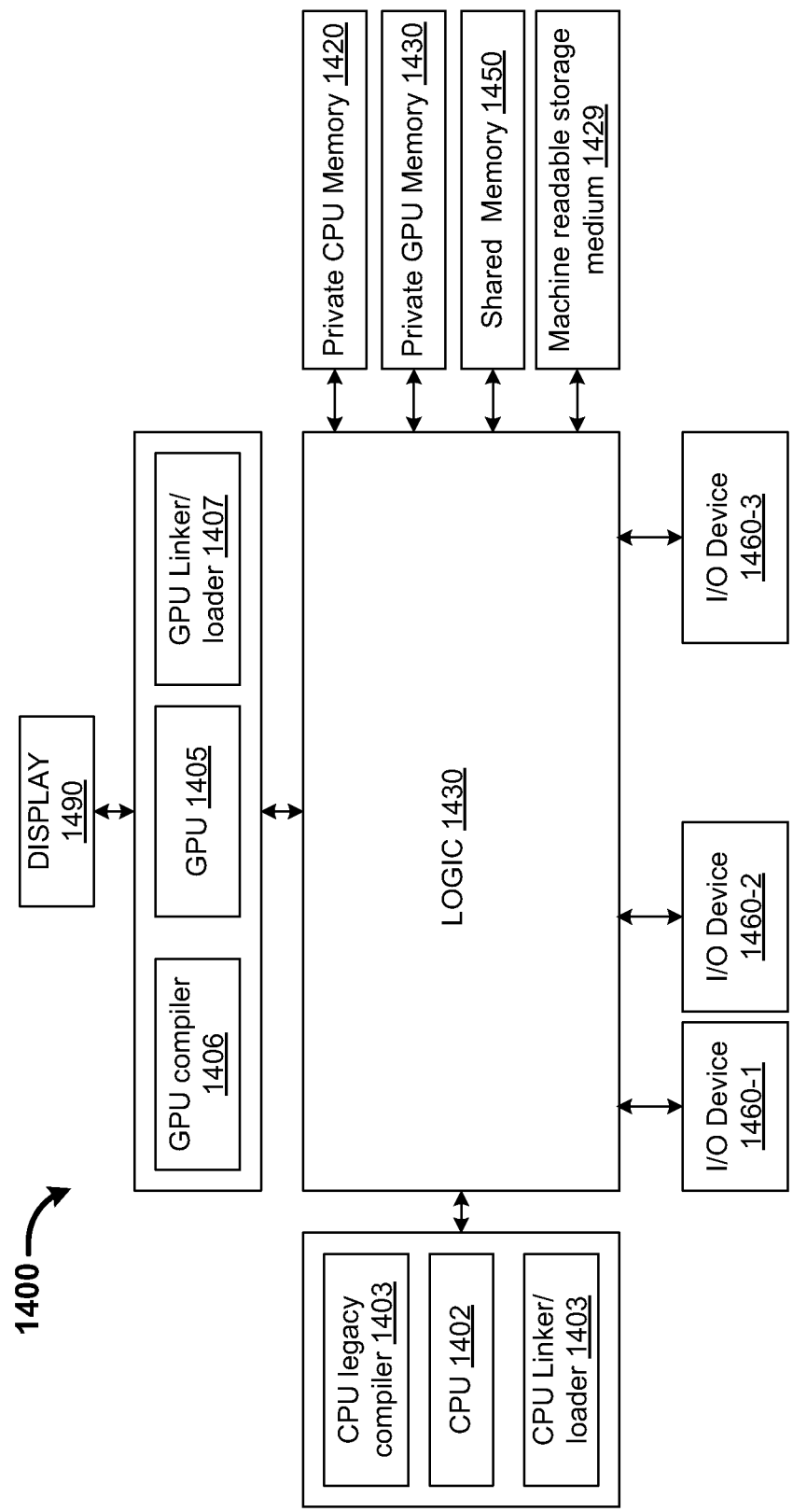
FIG. 14 illustrates a computer system that may provide two way communication support between the heterogeneous processors of a platform using fine grain partition of the shared object in accordance with one embodiment.

An embodiment of a computer system 1400 comprising the heterogeneous processors that support two-way communication is illustrated in FIG. 14. Referring to FIG. 14, the computer system 1400 may include a general purpose processor (or CPU) 1402 including a single instruction multiple data (SIMD) processor and a graphics processor unit (GPU) 1405. The CPU 1402, in one embodiment, may perform enhancement operations in addition to performing various other tasks or store a sequence of instructions, to provide enhancement operations in machine readable storage medium 1425. However, the sequence of instructions may also be stored in the CPU private memory 1420 or in any other suitable storage medium. In one embodiment, the CPU 1402 may be associated with a CPU legacy compiler 1403 and a CPU linker/loader 1404. In one embodiment, the GPU 1405 may be associated with a GPU proprietary compiler 1406 and a GPU linker/loader 1407.

While a separate graphics processor unit GPU 1405 is depicted in FIG. 14, in some embodiments, the processor 1402 may be used to perform enhancement operations, as another example. The processor 1402 that operates the computer system 1400 may be one or more processor cores coupled to logic 1430. The logic 1430 may be coupled to one or more I/O devices 1460, which may provide interface the computer system 1400. The logic 1430, for example, could be chipset logic in one embodiment. The logic 1430 is coupled to the memory 1420, which can be any kind of storage, including optical, magnetic, or semiconductor storage. The graphics processor unit 1405 is coupled through a frame buffer to a display 1440.

In one embodiment, while using user intervention technique, the shared object 131 may be allocated on the first side (say CPU 1402) and then used on the second side (say GPU 1408) such that the GPU may invoke member functions of the shared object. In one embodiment, the user may cause the object (object 131) o be stored in a shared memory and then allocate the member functions to either one of the CPU 1402 or the GPU 1405. In one embodiment, the GPU compiler 1406 may identify the annotation tags associated with the member functions while compiling the objects.

In one embodiment, the user may add macros to, respectively, declare and initialize the pointer to virtual function table (vtable). In one embodiment, the GPU compiler 1406 may compile the object and generate a code for member functions annotated with the first annotation value. The GPU compiler 1406 may generate the CPU stub 610 for GPU member functions and the CPU side remote call stub 610 may replace the original definition of the GPU member functions after linking with other user codes built with CPU legacy compiler 1403. In one embodiment, the GPU compiler 1406 may generate GPU side gluing logic 630 to dispatch a remote GPU member function call from the CPU side. In one embodiment, the GPU compiler 1406 may generate GPU stub 660, a remote call API 670, and the CPU side gluing logic 680 to dispatch a CPU member function call from the GPU side.

In other embodiment, while using the automatic technique, the GPU proprietary compiler 1406 may load the GPU virtual function tables (vtables) at the same address as that of the CPU vtable address in the heterogeneous CPU and GPU platform. In one embodiment, the GPU compiler 1406 may generate CPU object files (first_obj_files) for shared class vtables and store such shared class vtables in a special section (say .VtGPU) of the object file. The CPU compiler 1403 may generate CPU object files (second_obj_files) that may be linked with the CPU object files (first_obj_files) generated by the GPU compiler. The templates of building facilities (i.e. makefile or project file) may be arranged to have the first_obj_files (generated by the GPU compiler) precede the second_obj_files (generated by the CPU compiler). In one embodiment, the CPU linker/loader 1404 may generate a final CPU executable using the GPU compiler generated GPU vtable code (which may be a COMDATA symbol, for example) instead of a CPU vtable code generated by the CPU compiler. The GPU linker/loader 1407 may collect GPU vtable codes at one contiguous section in the CPU executable as the first_obj_files have the same name .VtGPU. In one embodiment, to identify the boundary of this special section (.VtGPU), the runtime library may allocate a variable (boundary_var) to know the start and the end of the .VtLRB section. The run time library may use the start symbol to identify the start address of the special section .VtGPU. After identifying the section start address, the GPU linker/loader 1407 may adjust the GPU executable base address such that the GPU vtable section may also reside at the same address.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multi-core processor or as a set of software instructions stored in a machine readable medium.

What is claimed is:

1. A method in a computer platform comprising:
    creating a shared object accessible by a plurality of heterogeneous processors that includes a first processor and a second processor, wherein the shared object may include first member functions and second member functions,
    allocating the first member functions to a first processor and the second member functions to a second processor,
    allowing the first processor to invoke the second member functions and the second processor to invoke the first member functions,
    associating the first member functions with a first annotation value to allocate the first member functions to the first processor and associating the second member functions with a second annotation value to allocate the second member functions to the second processor,
    declaring a pointer to virtual function table of the first processor using a first macro function, and
    initializing the pointer to the virtual function table of the first processor using a second macro function,
    wherein the first processor invoking the second member functions and the second processor invoking the first member functions provides a two-way communication between the first processor and the second processor, and
    wherein the first member functions and the second member functions include virtual functions.

2. The method of claim 1, further comprises generating a first enabling path to allow the first processor to invoke second member functions, wherein the first enabling path comprises a second remote call stub associated with the second processor and a first gluing logic associated with the first processor, wherein the second remote call stub and the first gluing logic are generated by a compiler associated with the first processor.

3. The method of claim 2 further comprises generating a second enabling path to allow the second processor to invoke the first member functions, wherein the second enabling path comprises a first remote call stub associated with the first processor and a second gluing logic associated with the second processor, wherein the first remote call stub and the second gluing logic are generated by the compiler associated with the first processor.

4. The method of claim 1, wherein the first macro function is to override new operator with shared memory allocation and release runtime calls and the second macro is to initialize the pointer to virtual functions table of the first processor with a proper runtime call.

5. The method of claim 1 comprises loading virtual function tables of the first processor and the second processor at same address without user intervention.

6. A method in a computer platform comprising:
    creating a shared object accessible by a plurality of heterogeneous processors that includes a first processor and a second processor, wherein the shared object may include first member functions and second member functions,
    allocating the first member functions to a first processor and the second member functions to a second processor,
    allowing the first processor to invoke the second member functions and the second processor to invoke the first member functions, loading virtual function tables of the first processor and the second processor at same address without user intervention, generating first object files for virtual function tables of the shared object using the first compiler, generating second object files for virtual function tables of the shared object using a second compiler associated with the second processor, and linking the first object files and the second object files, wherein the first processor invoking the second member functions and the second processor invoking the first member functions provides a two-way communication between the first processor and the second processor.

7. The method of claim 6 comprises storing the virtual function tables in a section of an object file.

8. The method of claim 7 comprises using virtual function tables generated by the first processor instead of using the virtual function tables generated by the second processor while generating a second executable file of the second processor.

9. The method of claim 8 comprises arranging the virtual function tables generated by the first processor in contiguous locations of the second executable file preceding the virtual function tables generated by the second processor.

10. The method of claim 7 comprises adjusting base address of a first executable file generated by the first processor to cause the virtual function tables generated by the first processor to reside at the same location as that of the second executable file.

11. The method of claim 10 comprises identifying a start address of the section and retrieving the start address of the section.

12. A non-transitory machine-readable storage medium comprising a plurality of instructions that in response to being executed result in a processor:

creating a shared object accessible by a plurality of heterogeneous processors that includes a first processor and a second processor, wherein the shared object may include first member functions and second member functions, allocating the first member functions to a first processor and the second member functions to a second processor, allowing the first processor to invoke the second member functions and the second processor to invoke the first member functions, associating the first member functions with a first annotation value to allocate the first member functions to the first processor and associating the second member functions with a second annotation value to allocate the second member functions to the second processor, declaring a pointer to virtual function table of the first processor using a first macro function, and initializing the pointer to the virtual function table of the first processor using a second macro function, wherein the first processor invoking the second member functions and the second processor invoking the first member functions provides a two-way communication between the first processor and the second processor, and wherein the first member functions and the second member functions include virtual functions.

13. The non-transitory machine-readable storage medium of claim 12, further comprises generating a first enabling path to allow the first processor to invoke second member functions, wherein the first enabling path comprises a second remote call stub associated with the second processor and a first gluing logic associated with the first processor, wherein the second remote call stub and the first gluing logic are generated by a compiler associated with the first processor.

14. The non-transitory machine-readable storage medium of claim 13 further comprises generating a second enabling path to allow the second processor to invoke the first member functions, wherein the second enabling path comprises a first remote call stub associated with the first processor and a second gluing logic associated with the second processor, wherein the first remote call stub and the second gluing logic are generated by the compiler associated with the first processor.

15. The non-transitory machine-readable storage medium of claim 12, wherein the first macro function is to override new operator with shared memory allocation and release runtime calls and the second macro is to initialize the pointer to virtual functions table of the first processor with a proper runtime call.

16. The non-transitory machine-readable storage medium of claim 12 comprises loading virtual function tables of the first processor and the second processor at same address without user intervention.

17. A non-transitory machine-readable storage medium comprising a plurality of instructions that in response to being executed result in a processor:

creating a shared object accessible by a plurality of heterogeneous processors that includes a first processor and a second processor, wherein the shared object may include first member functions and second member functions, allocating the first member functions to a first processor and the second member functions to a second processor, allowing the first processor to invoke the second member functions and the second processor to invoke the first member functions, loading virtual function tables of the first processor and the second processor at same address without user intervention, generating first object files for virtual function tables of the shared object using the first compiler, generating second object files for virtual function tables of the shared object using a second compiler associated with the second processor, and linking the first object files and the second object files wherein the first processor invoking the second member functions and the second processor invoking the first member functions provides a two-way communication between the first processor and the second processor.

18. The non-transitory machine-readable storage medium of claim 17 comprises storing the virtual function tables in a section of an object file.

19. The non-transitory machine-readable storage medium of claim 18 comprises using virtual function tables generated by the first processor instead of using the virtual function tables generated by the second processor while generating a second executable file of the second processor.

20. The non-transitory machine-readable storage medium of claim 19 comprises arranging the virtual function tables generated by the first processor in contiguous locations of the second executable file preceding the virtual function tables generated by the second processor.

21. The non-transitory machine-readable storage medium of claim 18 comprises adjusting base address of a first executable file generated by the first processor to cause the virtual function tables generated by the first processor to reside at the same location as that of the second executable file.

22. The non-transitory machine-readable storage medium of claim 21 comprises identifying a start address of the section and retrieving the start address of the section.

23. An apparatus comprising:
a plurality of heterogeneous processors including a first processor and a second processor, wherein the first processor is coupled to a first compiler and the second processor is coupled to a second compiler,
wherein the first compiler is to
create a shared object that includes first virtual member functions allocated to the first processor and second virtual member functions allocated to the second processor,
associate the first virtual member functions to the first processor based on a first annotation value provided by a user and to associate the second virtual member functions to the second processor based on a second annotation value provided by the user, and
compile
a first macro function to cause a declaration of a pointer to a virtual function table of the first processor, and
a second macro function to cause initialization of the pointer to the virtual function table of the first processor,
wherein the first macro function is to override new operator with shared memory allocation and release runtime calls and the second macro is to initialize the pointer to virtual functions table of the first processor with a proper runtime call,
wherein the first processor is able to directly access the first virtual member functions and call the second virtual member functions,
wherein the second processor is able to directly access the second virtual member functions and call the first virtual member functions, and
wherein the first processor being able to call the second virtual member functions and the second processor being able the call the first virtual member functions provides a bi-directional communication path between the first processor and the second processor.

24. The apparatus of claim 23, wherein the first compiler is to generate a second remote call stub associated with the second processor and a first gluing logic associated with the first processor to allow the second processor to call the first virtual member functions.

25. The apparatus of claim 23, wherein the first compiler is to generate a first remote call stub associated with the first processor and a second gluing logic associated with the second processor to allow the first processor to call the second virtual member functions.

26. The apparatus of claim 23, wherein the first compiler is to load the virtual function tables of the first processor and the second processor at same address without user intervention.

27. An apparatus comprising:
a plurality of heterogeneous processors including a first processor and a second processor wherein the first processor is coupled to a first compiler and the second processor is coupled to a second compiler,
wherein the first compiler is to
create a shared object that includes first virtual member functions allocated to the first processor and second virtual member functions allocated to the second processor,
load the virtual function tables of the first processor and the second processor at same address without user intervention, and
generate first object files for the virtual function tables of the shared object,
wherein the second compiler is to generate second object files for virtual function tables of the shared object,
wherein a linker coupled to the first compiler, wherein the linker is to link the first object files and the second object files,
wherein the first processor is able to directly access the first virtual member functions and call the second virtual member functions,
wherein the second processor is able to directly access the second virtual member functions and call the first virtual member functions, and
wherein the first processor being able to call the second virtual member functions and the second processor being able the call the first virtual member functions provides a bi-directional communication path between the first processor and the second processor.

28. The apparatus of claim 27, wherein the first compiler is to generate a second executable file of the second processor using the virtual function tables generated by the first processor instead of using the virtual function tables generated by the second processor.

29. The apparatus of claim 27, wherein the first compiler is to store the virtual function tables in a section of an object file, wherein the first compiler is to arrange the virtual function tables of the first processor in contiguous locations of the second executable file preceding the virtual function tables generated by the second processor.

30. The apparatus of claim 29, wherein the first compiler is to adjust base address of a first executable file generated by the first processor to cause the virtual function tables generated by the first processor to reside at the same location as that of the second executable file.

31. The apparatus of claim 30, wherein the first compiler is to retrieve the start address of the section after identifying a start address of the section.

32. A system comprising:
a plurality of input output devices, and
a computer platform, wherein the computer platform is to support a plurality of heterogeneous processors including a first processor and a second processor, wherein the first processor is coupled to a first compiler and the second processor is coupled to a second compiler,
wherein the first compiler is to
create a shared object that includes first virtual member functions allocated to the first processor and second virtual member functions allocated to the second processor,
associate the first virtual member functions to the first processor based on a first annotation value provided by a user and to associate the second virtual member functions to the second processor based on a second annotation value provided by the user, and
compile
a first macro function to cause a declaration of a pointer to a virtual function table of the first processor, and
a second macro function to cause initialization of the pointer to the virtual function table of the first processor,
wherein the first macro function is to override new operator with shared memory allocation and release runtime calls and the second macro is to initialize the pointer to virtual functions table of the first processor with a proper runtime call, wherein the first processor is able to directly access the first virtual member functions and call the second virtual member functions, wherein the second processor is able to directly access the second virtual member functions and call the first virtual member functions, and wherein the first processor being able to call the second virtual member functions and the second processor being able the call the first virtual member functions provides a bi-directional communication path between the first processor and the second processor.

33. The system of claim 32, wherein the first compiler is to generate a second remote call stub associated with the second processor and a first gluing logic associated with the first processor to allow the second processor to call the first virtual member functions.

34. The system of claim 32, wherein the first compiler is to generate a first remote call stub associated with the first processor and a second gluing logic associated with the second processor to allow the first processor to call the second virtual member functions.

35. The system of claim 32, wherein the first compiler is to load the virtual function tables of the first processor and the second processor at same address without user intervention.

36. A system comprising:
a plurality of input output devices, and
a computer platform, wherein the computer platform is to support a plurality of heterogeneous processors including a first processor and a second processor, wherein the first processor is coupled to a first compiler and the second processor is coupled to a second compiler,
wherein the first compiler is to
create a shared object that includes first virtual member functions allocated to the first processor and second virtual member functions allocated to the second processor,
load the virtual function tables of the first processor and the second processor at same address without user intervention, and
generate first object files for the virtual function tables of the shared object, wherein the second compiler is to generate second object files for virtual function tables of the shared object, wherein a linker coupled to the first compiler, wherein the linker is to link the first object files and the second object files wherein the first processor is able to directly access the first virtual member functions and call the second virtual member functions, wherein the second processor is able to directly access the second virtual member functions and call the first virtual member functions, and wherein the first processor being able to call the second virtual member functions and the second processor being able the call the first virtual member functions provides a bi-directional communication path between the first processor and the second processor.

37. The system of claim 36, wherein the first compiler is to generate a second executable file of the second processor using the virtual function tables generated by the first processor instead of using the virtual function tables generated by the second processor.

38. The system of claim 36, wherein the first compiler is to store the virtual function tables in a section of an object file, wherein the first compiler is to arrange the virtual function tables of the first processor in contiguous locations of the second executable file preceding the virtual function tables generated by the second processor.

39. The system of claim 38, wherein the first compiler is to adjust base address of a first executable file generated by the first processor to cause the virtual function tables generated by the first processor to reside at the same location as that of the second executable file.

40. The system of claim 39, wherein the first compiler is to retrieve the start address of the section after identifying a start address of the section.

* * * * *

UNITED STATES PATENT AND TRADEMARK OFFICE
CERTIFICATE OF CORRECTION

| | | |
|---|---|---|
| PATENT NO. | : 8,719,839 B2 | Page 1 of 1 |
| APPLICATION NO. | : 13/504972 | |
| DATED | : May 6, 2014 | |
| INVENTOR(S) | : Shoumeng Yan et al. | |

It is certified that error appears in the above-identified patent and that said Letters Patent is hereby corrected as shown below:

On the title page, in item (54) in column 1, line 2, and in the Specification, column 1, line 2, in "Title" delete "HETEROGENOUS" and insert -- HETEROGENEOUS --, therefor.

On the title page, in item (57), in column 2, in "Abstract", line 4, delete "unit) GPU" and insert -- unit (GPU) --, therefor.

In the Drawings

On sheet 4 of 11, in Figure 7A, line 6, delete "Virtural" and insert -- Virtual --, therefor.

On sheet 8 of 11, in Figure 11A, line 6, delete "Virtural" and insert -- Virtual --, therefor.

In the Claims

In column 17, line 39, in claim 23, delete "able the" and insert -- able to --, therefor.

In column 17, line 57, in claim 27, delete "processor wherein" and insert -- processor, wherein --, therefor.

In column 18, line 17, in claim 27, delete "able the" and insert -- able to --, therefor.

In column 19, line 9, in claim 32, delete "able the" and insert -- able to --, therefor.

In column 20, line 16, in claim 36, delete "able the" and insert -- able to --, therefor.

Signed and Sealed this
Fifteenth Day of July, 2014

Michelle K. Lee
*Deputy Director of the United States Patent and Trademark Office*